USO12099951B2

(12) United States Patent
Mahaffey et al.

(10) Patent No.: US 12,099,951 B2
(45) Date of Patent: Sep. 24, 2024

(54) MANAGEMENT OF WASHROOM COMPONENTS

(71) Applicant: Kimberly-Clark Worldwide, Inc., Neenah, WI (US)

(72) Inventors: Cleary E. Mahaffey, Canton, GA (US); Ricky W. Purcell, Dawsonville, GA (US); Frederick J. Williams, Jr., Cumming, GA (US); Stephen Becker, Cumming, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 15/733,859

(22) PCT Filed: May 31, 2019

(86) PCT No.: PCT/US2019/034798
§ 371 (c)(1),
(2) Date: Nov. 30, 2020

(87) PCT Pub. No.: WO2019/232298
PCT Pub. Date: Dec. 5, 2019

(65) Prior Publication Data
US 2021/0232999 A1 Jul. 29, 2021

Related U.S. Application Data

(60) Provisional application No. 62/678,363, filed on May 31, 2018.

(51) Int. Cl.
*G06Q 10/0633* (2023.01)
*G06Q 10/0631* (2023.01)
*G06Q 10/20* (2023.01)

(52) U.S. Cl.
CPC ... *G06Q 10/0633* (2013.01); *G06Q 10/06313* (2013.01); *G06Q 10/20* (2013.01)

(58) Field of Classification Search
None
See application file for complete search history.

(56) References Cited

U.S. PATENT DOCUMENTS 4,456,193 A * 6/1984 Westover ............... B41J 15/04
242/563.2
5,438,711 A * 8/1995 Higuchi ............... A47K 13/20
4/243.3

(Continued)

FOREIGN PATENT DOCUMENTS

CA      2523659 A1    4/2007
CN    103696471 A    4/2014

(Continued)

OTHER PUBLICATIONS

Shuaeb MA. Clogging Potential of Low-Flush Toilet Drain System, Doctoral dissertation, 2017 https://s-space.snu.ac.kr/bitstream/10371/137305/1/000000145797.pdf (Year: 2017).*

(Continued)

*Primary Examiner* — Octavian Rotaru
(74) *Attorney, Agent, or Firm* — Dority & Manning, P.A.

(57) ABSTRACT

A washroom management system with a sensor to generate operability level data for a washroom component: a controller to modify operation of the washroom component; and a central management system to access the operability level data, communicate with the controller and evaluate the operability data to determine an actionable event type for the washroom component, and the central system further configured to in response to determining the event type is the automated resolution event, put the washroom component into the issue resolution state and then putting the washroom component to one of the normal operation state or disabled (Continued)

state based on evaluating the operability level data after the issue resolution state; and in response to determining the event type is the assisted resolution event, leave the washroom component in the normal operation state or put it into the disabled state and causing a message to be sent to an attendant.

9 Claims, 5 Drawing Sheets

(56) References Cited

U.S. PATENT DOCUMENTS

| | | | | |
|---|---|---|---|---|
| 5,725,321 | A * | 3/1998 | Brannan | B41J 15/042 |
| | | | | 242/571.5 |
| 6,810,902 | B2 * | 11/2004 | Bootka | E03D 11/00 |
| | | | | 4/395 |
| 11,013,377 | B2 * | 5/2021 | Katsurayama | E03D 9/00 |
| 11,141,027 | B2 * | 10/2021 | Starkey | A47K 10/3625 |
| 2005/0171709 | A1 * | 8/2005 | Nortier | E03D 5/105 |
| | | | | 702/45 |
| 2006/0173576 | A1 * | 8/2006 | Goerg | A47K 10/3662 |
| | | | | 700/236 |
| 2009/0119142 | A1 * | 5/2009 | Yenni | H04L 67/12 |
| | | | | 705/7.15 |
| 2015/0177917 | A1 * | 6/2015 | Hoekstra | G06Q 10/10 |
| | | | | 715/771 |
| 2017/0168508 | A1 * | 6/2017 | Bush | F16K 37/0091 |
| 2017/0254060 | A1 * | 9/2017 | Hall | E03D 3/12 |
| 2018/0010322 | A1 * | 1/2018 | Grover | G01S 15/88 |
| 2018/0064295 | A1 * | 3/2018 | Okada | A47K 7/04 |
| 2018/0075375 | A1 * | 3/2018 | Becker | G06Q 10/0631 |
| 2018/0135285 | A1 * | 5/2018 | Canfield | E03D 5/105 |
| 2020/0392710 | A1 * | 12/2020 | Saruta | G06Q 50/10 |

FOREIGN PATENT DOCUMENTS

| | | | | |
|---|---|---|---|---|
| CN | 105404194 | A | 3/2016 | |
| CN | 106184261 | A | 12/2016 | |
| CN | 106193226 | A | 12/2016 | |
| EP | 0792971 | A1 | 9/1997 | |
| JP | 2002021163 | A | 1/2002 | |
| KR | 100804055 | B1 | 2/2008 | |
| KR | 20150127426 | A | 11/2015 | |
| WO | 2005065509 | A1 | 7/2005 | |
| WO | WO-2010108295 | A2 * | 9/2010 | E03D 5/105 |
| WO | 2013159953 | A1 | 10/2013 | |
| WO | WO-2018004533 | A1 * | 1/2018 | A47K 10/34 |
| WO | 19104354 | A1 | 5/2019 | |

OTHER PUBLICATIONS

Translated WO 2010108295 A2 (Year: 2010).*
Chinese Office Action Corresponding to Application No. 201980030420.5 on Sep. 28, 2023.

* cited by examiner

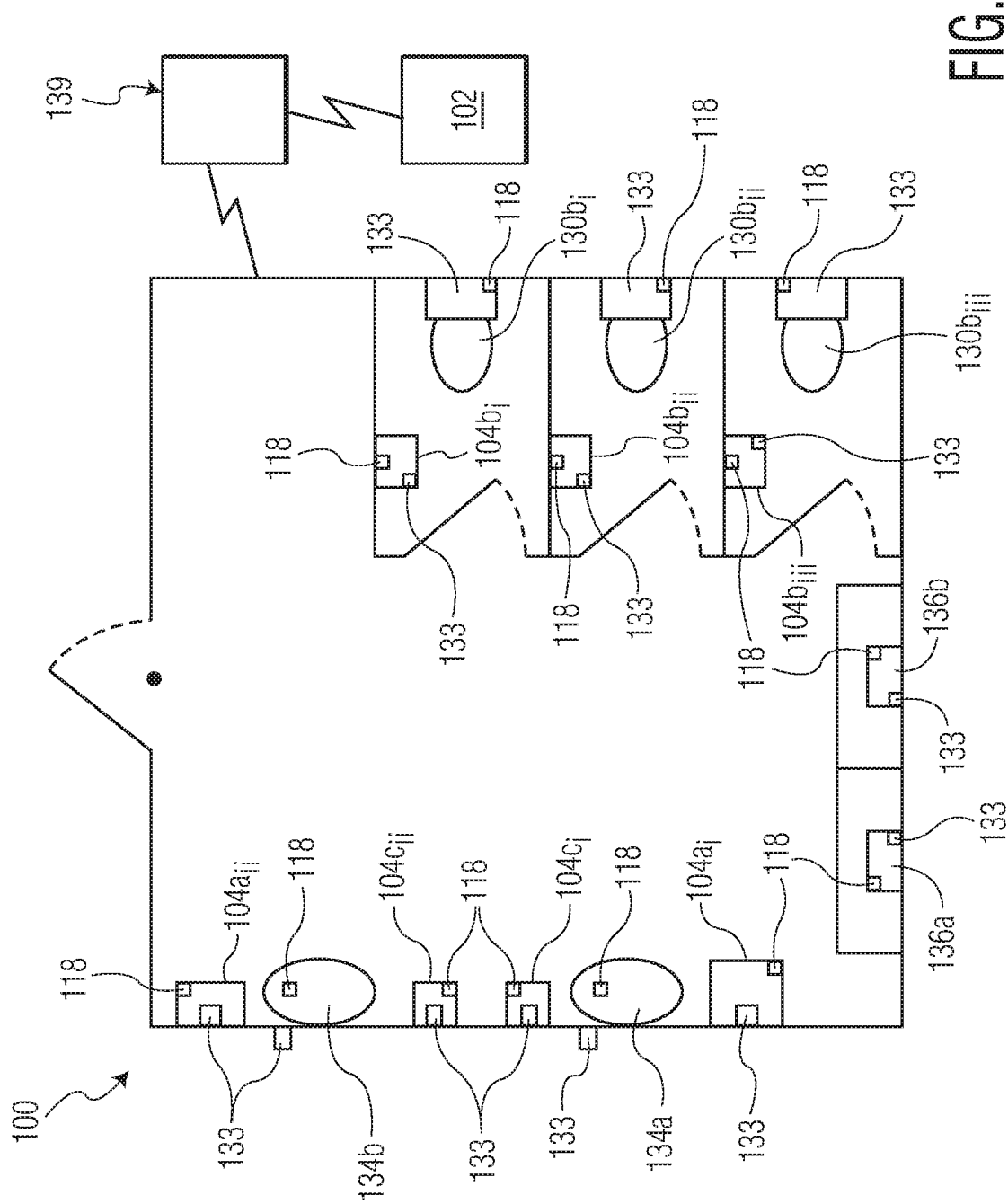

MANAGEMENT OF WASHROOM COMPONENTS

RELATED APPLICATIONS

The present application is the national stage entry of International Patent Application No. PCT/US2019/034798 having a filing date of May 31, 2019, which claims priority to Provisional Patent Application No. 62/678,363 having a filing date of May 31, 2018, both of which are incorporated herein in their entirety by reference thereto.

BACKGROUND

This disclosure relates to automating (or semi-automating) certain aspects of washroom servicing and maintenance.

Systems used in washrooms range from hand towel and bath tissue dispensers to toilets and urinals. Servicing such systems can be a time-intensive endeavor as an in-person visit may be required each time a service need arises. Further, timely cleaning or servicing (e.g., refilling bath tissue, hand towel and soap dispensers), user satisfaction and providing a good hygienic environment requires promptly handling, for example, any system malfunctions or depleted dispensers. However, given the limited resources available at most facilities to service washrooms, maintaining a clean and fully stocked washroom can be challenging.

SUMMARY

In general, the subject matter of this specification relates to automating (or semi-automating) washroom servicing and maintenance.

In general, one aspect of the subject matter described in this specification can be implemented in systems that include a functional sensor configured to generate operability level data for a washroom component defining a status of the washroom component; a controller configured to modify an operation of the washroom component, wherein the washroom component has a normal operation state, an issue resolution state and a disabled state with the normal operation state being normal function of the washroom component, the issue resolution state being for performing maintenance on the washroom component and the disabled state being for disabling the washroom component from functioning; and a central management system configured to access the operability level data, communicate with the controller and evaluate the operability data to determine an actionable event type for the washroom component, wherein the actionable event type comprises an automated resolution event and an assisted resolution event, and the central management system is further configured to, in response to determining the actionable event type is the automated resolution event, cause the controller to put the washroom component into the issue resolution state for a predetermined time period or sequence and then putting the washroom component to one of the normal operation state or disabled state based on evaluating the operability level data after the issue resolution state; and, in response to determining the action event type is the assisted resolution event, cause the controller to leave the washroom component in the normal operation state or put the washroom component into the disabled state, based on operability level data, and causing a message to be sent to a washroom attendant to service the washroom component. Other embodiments of this aspect include corresponding methods, apparatus, and computer program products.

Yet another aspect of the subject matter described in this specification can be implemented in methods that include accessing operability data from a sensor specifying a status of a washroom component; analyzing the operability data to determine an actionable event type for the washroom component, wherein the actionable event type comprises an automated resolution event and an assisted resolution event; in response to determining the actionable event type is the automated resolution event, directing the washroom component to enter the issue resolution state and then directing the washroom component to enter one of the normal operation state or disabled state based on an evaluation of the operability level data after the issue resolution state; and in response to determining the action event type is the assisted resolution event, and directing the washroom component to enter the normal operation state or the disabled state, based on an evaluation of the operability level data. Other embodiments of this aspect include corresponding systems, apparatus, and computer program products.

Particular embodiments of the subject matter described in this specification can be implemented so as to realize one or more of the following advantages. For example, servicing washrooms is time-intensive and costly as each service event normally requires a service attendant to visit the washroom and perform the service. In many cases, the attendants are on fixed schedules and only visit the washroom at specified times, even if there is an outstanding service need. The washroom maintenance automation system can eliminate the need for a service visit for some cases and assist with the service need in others. This lowers the cost associated with servicing the washroom as the number of service visits by an attendant can be reduced or the amount of work needed during a visit can be minimized, e.g., as the washroom maintenance automation system may have already addressed some of the service needs without the attendant's involvement. The washroom maintenance automation system can also increase user satisfaction with the washroom as the washroom can be serviced when needed and not always waiting for the next scheduled service visit for the attendant, which can leave the washroom in disrepair until that next visit days or weeks later.

The details of one or more implementations of the subject matter described in this specification are set forth in the accompanying drawings and the description below. Other features, aspects, and advantages of the subject matter will become apparent from the description, the drawings, and the claims.

DESCRIPTION OF DRAWINGS

FIG. 1A is a block diagram of an example environment in which a washroom maintenance automation system can be implemented.

DETAILED DESCRIPTION

Figure 1B:
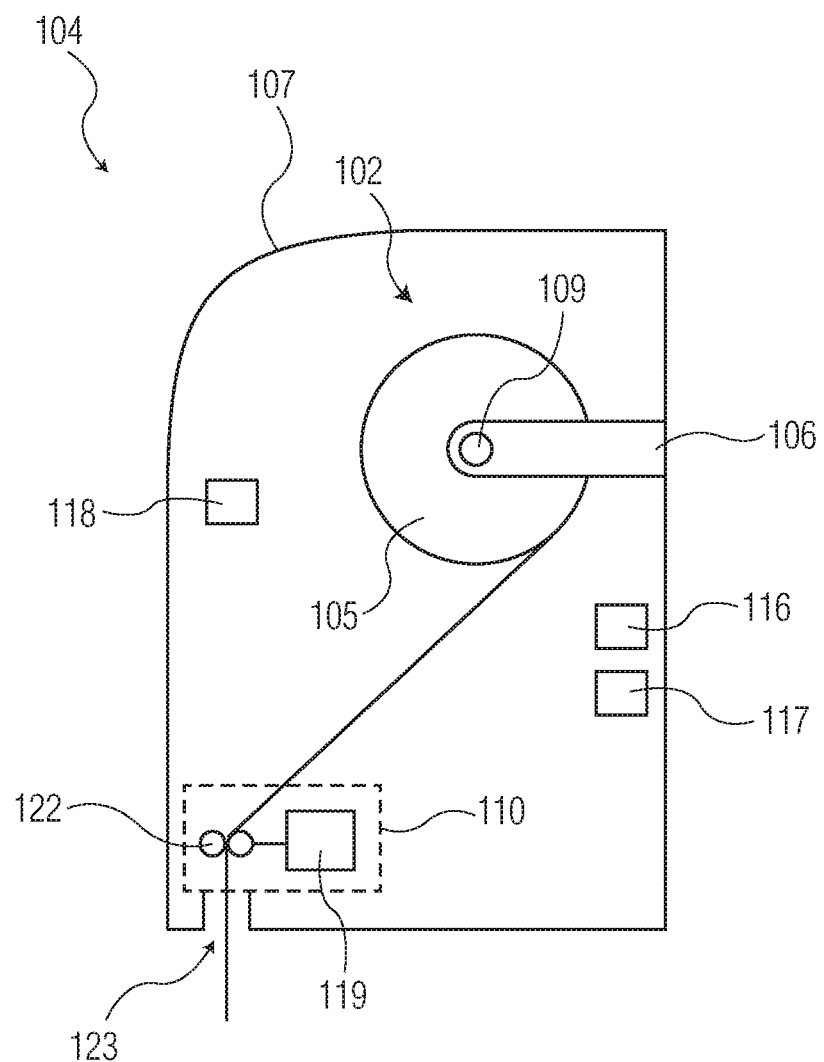
FIG. 1B is a right-side cutaway representation of an example dispenser.

The present disclosure generally relates to automating or semi-automating washroom service tasks such as, for example, clearing a clogged drain in a urinal or toilet or a clearing a paper jam in a dispenser, and otherwise assisting with washroom services. In some implementations, a washroom system facilitates such automation or semi-automation, and this system includes a sensor that monitors the functional state of a washroom component, e.g., dispenser, toilet, urinal, sink, etc., a controller to change the operation of the washroom component from a normal operation state to an issue resolution state or a disabled state, and back, and a central management system to instruct the controller as to which state the washroom component should be in based on the functional state of the washroom component.

By way of an example, the washroom has a toilet, and the washroom service system includes a sensor to monitor the level of water in the toilet bowl, a first controller to control the position of a water valve in the water supply pipe feeding the toilet and a second controller to control the actuator to flush the toilet. In response to the sensor reporting that the level of the water is high, indicating a possible clog, the system can cause the second controller to flush the toilet two or three consecutive times to try and clear the clog. Or the system can cause the controller to activate a dispenser in the toilet to release a dissolving agent into the bowl to try to clear the clog. In these ways, the system is automating the servicing of the toilet. If, after these flushes or treatment, the sensor reports a normal water level, the system 102 determines that the clog has been cleared and the toilet is in a normal operational state.

If, however, the sensor continues to report that the water level is high the system can cause the first controller to close the valve to prevent the toilet from overflowing. Further, the system can send a message to cause alert an attendant that the toilet needs additional servicing. In this way the system is assisting with the servicing of the toilet. The operation of such a washroom servicing system is described in more detail below.

Washroom components include, for example, dispensers 104, sinks/faucets 134, toilets 130, and urinals 136, as shown in FIG. 1A, which is a block diagram of an example environment in which a washroom maintenance automation system 100 can be implemented. The environment in FIG. 1A also includes a central management system (e.g., a data processing apparatus) 102 and, in some implementations, a gateway 139 to facilitate communications between the washroom components and the central management system 102. In some implementations, the gateway 139 is a router or other network communication device(s). In some implementations, the washroom components and central management system 102 can directly communicate across wireless or wired channels, or some combination thereof, and directly or through intermediaries. For example, the central management system 102 includes a transceiver and microprocessor to facilitate such communications.

Figure 1C:
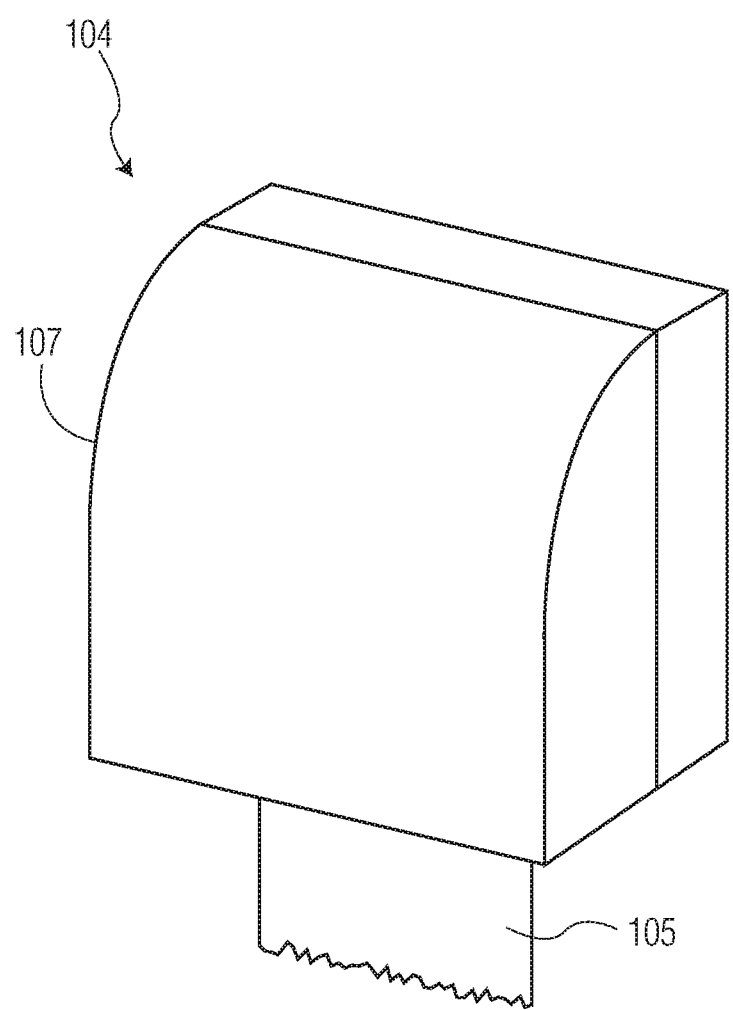
FIG. 1C is a perspective representation of the dispenser of FIG. 1B.

As described above, washroom components can include dispensers 104. FIG. 1B is a right-side cutaway representation of an example dispenser 104 and FIG. 1C is a perspective representation of the dispenser 104 of FIG. 1B. A dispenser 104 or hygiene dispenser 104 dispenses consumable hygiene product 105 (e.g., bath tissue, hand towels, hand sanitizer, soap, lotion, deodorizer, air freshener, etc.), which is a product intended to promote good hygiene or sanitation such as by cleaning or sanitizing a user and/or a surface. In some implementations, a dispenser 104, more generally, is a device that holds consumable hygiene product 105 and dispenses the product 105 in response to a stimulus, e.g., an environmental stimulus (e.g., light/darkness), at pre-determined (e.g., programmatically set) intervals or by manual user actuation such as pulling an exposed portion of the consumable product or via a pumping-type process (e.g., for some manual soap dispensers). Although FIG. 1B shows a rolled product dispenser 104 (e.g., a paper towel dispenser 104a), other hygienic dispensers are also envisioned such as, for example, soap/sanitizer dispensers 104c, bath tissue dispensers 104b, air fresher dispensers (not pictured), hand or facial care dispensers (not pictured), seat cover dispensers (not pictured), surface cleaning, sanitizing or disinfecting dispensers (not pictured) including for toilets 130 or urinals 136, and/or the like. Such dispensers 104 are generally refillable such that once the product 105 stored in the dispenser 104 is depleted a service attendant can refill the dispenser 104 with additional product 105.

The dispenser 104 includes a body 107 or outer cover 107, e.g., a composite or metal housing. The outer cover 107 encloses, fully or partially, a product holding area 102 or interior 102 of the dispenser 104. The product holding area 102 holds, for example, the product-to-be-dispensed 105 by the dispenser 104 and, in some implementations, one or more electrical or mechanical components used to enable the dispense process such as a motor, batteries, rollers, sensors to determine when a user requests a dispense, etc., as described in more detail below.

The dispenser 104 also includes a dispensing mechanism 110. The dispensing mechanism 110 operates to dispense a portion of the consumable product 105 in the holding area 102 (e.g., dispense a length of roll 105 for use to dry hands or a shot of soap 105 or sanitizer to clean hands). In some implementations, for example, for rolled paper towels 105 or wipers 105 or bath tissue 105, the dispensing mechanism 110 is an electromechanical feed mechanism that includes or operates in conjunction with a motor 119 that, in response to a stimulus such as a user waving a hand proximate the dispenser 104, feeds a length of the roll 105 through an opening 123 in the body 107 to present to the user. For example, the dispensing mechanism 110 can include a series of rollers 122 through which a portion of the roll 105 is feed such that when the dispensing mechanism 110 actuates it pulls and unwinds the roll 105 (or causes the roll 105 to be pulled and unwound) to feed a portion of the roll 105 to the user. In some implementations, the motor 119 can be integral to the roll holder 106 and causes a spindle 109 of the roll holder 106 (e.g., on which the rolled product 105 is mounted) to turn thereby causing the roll 105 to unwind and be dispensed. In the case, for example, of a liquid soap or sanitizer or lotion dispenser 104 the motor 119 may be a pump 119 that draws the liquid product from a bottle, cassette or other container holding the liquid product 105 and ejects the drawn product to the user for a dispense operation.

In some implementations, the dispenser 104 is a user-driven dispensing unit, e.g., the dispense process is not powered by a motor or other electromechanical generator. For example, for a rolled paper product dispenser 104 such as a paper towel or bath tissue dispenser 104, a user may grab an exposed tail of the roll 105 and pull to cause more of the product 105 to be dispensed. For a liquid soap or sanitizer dispenser 104, a user may depress or otherwise manually actuate a pump (e.g., dispensing mechanism 110) to draw the product 105 from its container and dispense the product 105.

In some implementations, the dispenser 104 includes a processor 118 such as a microprocessor or microcontroller 118. The processor 118 is a device that executes the instructions stored in memory or otherwise accessible to the processor 118. The processor 118 interfaces with and, in some implementations, controls the operation of other devices/components in the dispenser 104 such as the motor 119 and transceiver 117, which can be used to communicate with external devices. The dispenser also includes a functional sensor 116, as described in more detail bellow.

Figure 1D:
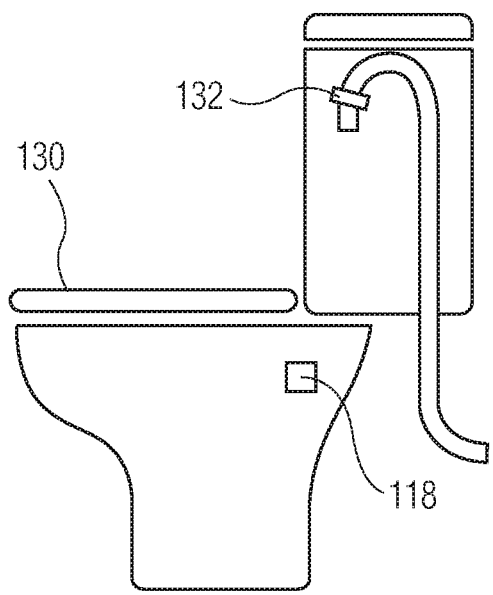
FIG. 1D is a side cutaway representation of a toilet with a valve closed.
Figure 1E:
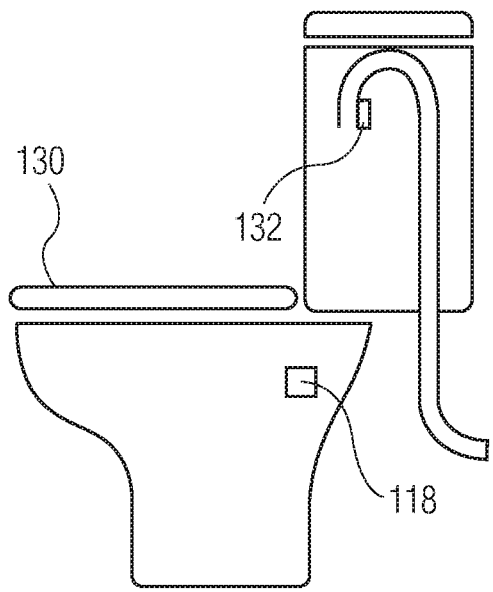
FIG. 1E is a side cutaway representation of the toilet of FIG. 1D with the valve opened.

As described above, washroom components can, among others, include toilets 130. FIG. 1D is a side cutaway representation of a toilet 130 with a valve 132 closed, and FIG. 1E is a side cutaway representation of the toilet 130 of FIG. 1D with the valve 132 opened. When the valve is in the open position (FIG. 1D) water can fill the tank for normal operation. When the valve 132 is closed (FIG. 1C) water is prevented from filling the tank.

The system 100 includes functional sensors 116 coupled, directly or indirectly, to respective washroom components. A functional sensor 116 is a device that generates or determines operability level data defining a mechanical or operational status or state of its respective washroom component or attendant product 105, as applicable. Example functional sensors 116 include a consumable product (e.g., product 105) level sensor, a water flow sensor, a flush valve sensor, and a motor current sensor.

The consumable product level sensor 116, for example, tracks the amount of product 105 remaining in the dispenser 104 or the amount of product 105 used in the dispenser 104, e.g., since the last refill. An example consumable product level sensor 116 is an arm mounted on a pivot on one end and resting on the periphery of a rolled paper product 105 at the other end. As the roll 105 is used, reducing its diameter, the arm pivots resulting in a change in its angular displacement. The change in angular displacement can be used to determine the amount of product 105 used.

By way of another example, the consumable product level sensor 116 is an infrared or sonic detection system that measures a distance between itself and the product 105 and changes in this distance can be used to track product 105 used. For example, as a roll of paper towels 105 is used its diameter decreases, and the sensor 116 can detect and measure this decrease. Or as a stack of folded paper towels 105 is used the stack height reduces and the sensor 116 can detect and measure this height reduction, which, in turn can be used to determine the amount of product 105 used or remaining.

In some implementations, a mass sensor 116 can be used to measure the reduction in weight of the product 105 as the product 105 is depleted. This weight change can be used to determine the amount of product 105 remaining.

Functional sensors 116 can include a water flow sensors 116. Example water flow sensors 116 include positive displacement flow meters and piston meters. Water flow sensors 116 can be used to determine if water is draining, for example, from a sink 134, toilet 130 or urinal 136. As described above functional sensors 116 can also include a flush valve sensor 116. Flush valve sensors 116 can be contact position sensors, potentiometers, piezo-electric transducers and the like. Flush valve sensors 116 can be positioned to trigger when, for example, a toilet or urinal handle is actuated to cause a flush. Functional sensors 116 can also include motor current sensors 116. A motor current sensor 116 detects the amount of current being drawn by a motor (e.g., motor 119). Example motor current sensors 116 include Hall-Effect sensors and, for example, can determine current use in a dispenser 104 including overcurrent situations indicative of a jam or other malfunction.

The system 100 includes one or more controllers 133. A controller 133 is a device that modifies or changes the operational state of a washroom component. In some implementations, a controller 133 is or includes a data processing apparatus (e.g., microcontroller) that communicates with and controls certain features and functions of the washroom component. For example, the controller 133 can include (or control) an actuator to control a water flow valve 132 or a switch to control a motor 119 to manage the operation of the washroom component. A controller 133 can be co-located with a washroom component or remote to the washroom component. In some implementations, one controller 133 manages one washroom component. In other implementations, multiple controllers 133 manage the operational state of a washroom component. In yet other implementations, one controller 133 manages multiple washroom components.

As described above, the system 100 also includes a central management system 102. The system 102 can communicate with the functional sensors 116 to receive the operability data from the washroom components(s) (or otherwise access the operability data). In some implementations, the system 102 polls the sensors 116 on a periodic basis to collect the operability data, the sensors 116 push the data to the system 102 on a predetermined schedule, the sensors 116 (or washroom component) send the data to the system 102 in response to detecting abnormal operability data (e.g., data outside administrator set norms or parameters), or some combination thereof. The system 102 can evaluate the operability data to determine an actionable event type for each washroom component, which can be an automated resolution event or an assisted resolution event.

An actionable event is a maintenance or service need of the washroom component. For example, an actionable event is a low product 105 state for a dispenser 104, i.e., the dispenser 104 is running out of product 105, a malfunction of the dispenser 104, e.g., a paper jam or dead batteries, or a malfunction of a toilet 130, urinal 135 or sink 134 such as a water clog/clogged pipe. An automated resolution event is one in which the system 102 determines, at least initially, that no attendant intervention is required to address the maintenance or service need. An assisted resolution event is one in which the system 102 determines that attendant intervention is required to fully address the maintenance or service need.

In response, at least in part, to the type of actionable event and its attempted resolution outcome, the system 102 causes the controller 133 to put the washroom component into one of three operational states: (i) a normal operation state, (ii) an issue resolution state and (iii) a disabled state. The normal operation state defines that the washroom component is functioning normal, e.g., within standard operating specifications from the manufacturer. The issue resolution state defines that the washroom component is in need of maintenance. The disabled state defines that the washroom component has been disabled to prevent the washroom component from functioning/operating, e.g., when in the disabled state the dispenser 104 will not dispense product 105 and the toilet 130 will not flush.

Figure 2:
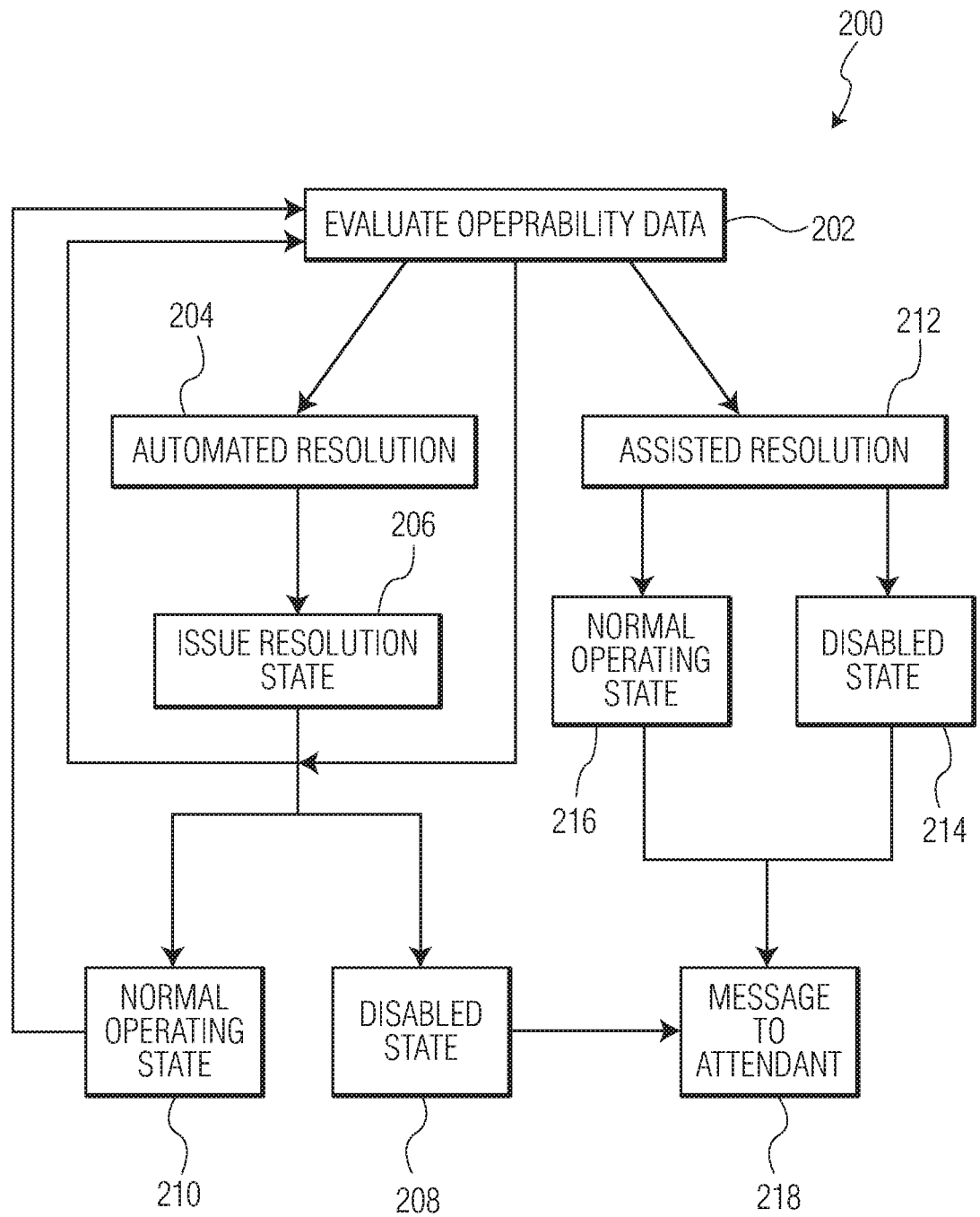
FIG. 2 is a flowchart for the operation of an example washroom maintenance automation system.

The functionality of the system 100 can be described below with reference to FIG. 2, which is a flowchart 200 for the operation of an example washroom maintenance automation system 100.

The operability data is evaluated (202). Based on this evaluation, the system 102 determines whether there is an actionable event. For example, the system 102 can determine whether there is an actionable event based on a comparison of the operability data with a pre-determined look-up table or other mapping of various operability data levels or states and corresponding actionable event types (if an actionable event is necessary for the operability data level/state). In some implementations, each washroom component has its own look-up table, which can be updated by an administrator, and accessed by the system 102. Thus, based on the evaluation of the operability data, the system 102 may determine that an actionable event exists and it is an automated resolution type (204) or an assisted resolution type (212) or that no actionable event exists as the operability data indicates the washroom component is functioning within normal operating parameters.

In response to determining that the actionable event is an automated resolution type the system 102 directs the controller 133 to put the washroom component in the issue resolution state (206). For each washroom component there may be multiple issue resolutions states. The system determines the particular issue resolution state to put the component in based on the operability data, e.g., according to the look-up table. For example, the functional sensors for a toilet 130 are a flush valve sensor and a water flow sensor, and the system 102 evaluates the operability data, e.g., in response to a flush valve actuation from the flush valve sensor, by analyzing the water flow reading from the water flow sensor and comparing the water flow reading to a predetermined water flow parameter. If the system 102 determines, from this evaluation, that the toilet 130 is clogged, then the system 102 determines that the issue resolution state for a clog (e.g., based on instructions in the look-up table) is to flush the toilet 130 three times. The system 102 then accesses operability data (back to step 202) subsequent to the issue resolution state (e.g., the flushing process in the above example).

More generally, when the controller 133 puts a washroom component into the issue resolution state, it does so for a predetermined sequence (e.g., three flushes) or period of time (flush for 30 seconds).

If the operability data indicates the same issue resolution state exists after going through the issue resolution process (e.g., three flushes), the system 102 directs the controller 103 to put the washroom component in the disabled state (208) to prevent further use of the washroom component. The system also causes a predetermined message to be sent to an attendant to service the washroom component including, in some implementations, the particular issue resolution state (218). In some implementations, for particular issues resolution states for certain washroom components, the system 102 may cause other washroom components to be put into the disabled state, e.g., based on instructions in the look-up table. For example, if a toilet 130 is clogged and the issue can't be resolved through the automated resolution process, the system 102 may cause the controller 133 for the toilet 130 to disable the toilet 130, e.g., turn the water valve 132 to the toilet 130 off and, optionally, cause the controller 133 for the bath tissue dispenser 104 for that toilet 130 to also enter the disabled state to prevent a user from putting (additional) bath tissue paper 105 in the clogged toilet 130 and making the clog worse.

If, however, the system 102 determines that the malfunction or service need no longer exists because it was addressed during the issue resolution state then the system 102 instructs the controller 133 to return the washroom component to the normal operating state (210) in accordance with pre-determined instructions (e.g., set or programmed by an administrator).

In response to determining that the actionable event is an assisted resolution type the system 102 directs the controller 133 to put the washroom component in the normal operating state (216) or the disabled state (214) according to the look-up table or other pre-specified instructions. For example, the operability data for a paper towel dispenser 104 may indicate that the product 105 in that dispenser 104 is low and needs to be refilled. In response, the system 102 directs the controller 133 for the dispenser 104 to keep the dispenser 104 in the normal operating state, as the dispenser 104 is fully functioning but just low on paper 105. However, as the washroom component will need to be serviced, the system 102 causes a predetermined message to be sent to an attendant to service the washroom component including, in some implementations, the cause for the particular assisted resolution state (218).

By way of another example, the operability data for the paper towel dispenser 104 may indicate that the product 105 in that dispenser 104 is fully depleted and needs to be refilled. In response, the system 102 directs the controller 133 for the dispenser 104 to put the dispenser 104 in the disabled operating state (e.g., disabling the motor 119 and/or causing an indicator light to flash indicating that the dispenser 104 is out of product 105), as the dispenser 104 cannot function without product 105. As the washroom component needs (e.g., immediate) service the system 102 causes a predetermined message to be sent to an attendant to service the washroom component including, in some implementations, the cause for the particular assisted resolution state (218).

With reference to yet another example, the system 102 may evaluate the operability data for a toilet 130 and determine that it is fully clogged (e.g., based on data from the flush and water flow sensors), and in response instruct the controller 133 to put the toilet 130 into the disabled state (e.g., as part of being an assisted resolution event type), and cause a predetermined message to be sent to an attendant to service the toilet 130 including, in some implementations, the cause for the particular disabled state (218).

In some implementations, the system 100 analyzes operability data from multiple washroom components to determine if an actionable event has occurred and, if so, the actionable event type. In some implementations, the system 102 can access first operability data from a first sensor specifying consumable product use from a first washroom component and second operability data from a second sensor specifying an operational state of a second washroom component. For example, the system 102 analyzes the first and second operability data sets (e.g., from the same time period) and determines high consumable product use from the first washroom component (e.g., a bath tissue dispenser 104 having abnormally high use) and a low operational state for the second washroom component (e.g., a toilet 130 that has lower exit water flow than normal). Thus, based on pre-defined instructions, the system 102 can determine that excess bath tissue 105 was deposited in the toilet 130 resulting in a clog. The system 102 can then take the necessary action to remedy (e.g., steps 204 or 212).

EMBODIMENTS

Embodiment 1. A washroom management system comprising:
- a functional sensor configured to generate operability level data for a washroom component defining a status of the washroom component; a controller configured to modify an operation of the washroom component, wherein the washroom component has a normal operation state, an issue resolution state and a disabled state with the normal operation state being normal function of the washroom component, the issue resolution state being for performing maintenance on the washroom component and the disabled state being for disabling the washroom component from functioning; and a central management system configured to access the operability level data, communicate with the controller and evaluate the operability data to determine an actionable event type for the washroom component, wherein the actionable event type comprises an automated resolution event and an assisted resolution event, and the central management system is further configured to: in response to determining the actionable event type is the automated resolution event, cause the controller to put the washroom component into the issue resolution state for a predetermined time period or sequence and then putting the washroom component to one of the normal operation state or disabled state based on evaluating the operability level data after the issue resolution state; and in response to determining the action event type is the assisted resolution event, cause the controller to leave the washroom component in the normal operation state or put the washroom component into the disabled state, based on operability level data, and causing a message to be sent to a washroom attendant to service the washroom component.

Embodiment 2. The system of embodiment 1, wherein the washroom component comprises one of a paper towel dispenser, a urinal, a toilet, bath tissue dispenser, a faucet, a soap dispenser, and a sanitizer dispenser.

Embodiment 3. The system of embodiments 1 or 2, wherein the functional sensor comprises at least one of a consumable product level sensor, a water flow sensor, a flush valve sensor, and a motor current sensor.

Embodiment 4. The system of any preceding embodiment, wherein in the automated resolution event and in response to putting the washroom component in the disabled state comprises causing a message to be sent to a washroom attendant to service the washroom component.

Embodiment 5. The system of any preceding embodiment, wherein the assisted resolution event is refilling the washroom component with consumable product.

Embodiment 6. The system of any preceding embodiment, wherein the issue resolution state comprises actuating the washroom component one or more times.

Embodiment 7. The system of embodiment 1, wherein the washroom component comprises a toilet or urinal, the functional sensor comprises a flush valve sensor and a water flow sensor, and evaluating the operability data comprises determining, in response to a flush valve actuation from the flush valve sensor, a water flow reading from the water flow sensor and comparing the water flow reading to a predetermined water flow parameter.

Embodiment 8. The system of embodiment 7, wherein the predetermined time period or sequence for the issue resolution state comprises causing the toilet or urinal to flush a specified number of times.

Embodiment 9. The system of embodiment 7, wherein the disabled state comprises causing the toilet or urinal to not flush.

Embodiment 10. A method comprising accessing operability data from a sensor specifying an operational state of a washroom component; analyzing the operability data to determine an actionable event type for the washroom component, wherein the actionable event type comprises an automated resolution event and an assisted resolution event; in response to determining the actionable event type is the automated resolution event, directing the washroom component to enter the issue resolution state and then directing the washroom component to enter one of the normal operation state or disabled state based on an evaluation of the operability level data after the issue resolution state; and in response to determining the action event type is the assisted resolution event, and directing the washroom component to enter the normal operation state or the disabled state, based on an evaluation of the operability level data.

Embodiment 11. The method of embodiment 10, wherein in response to determining the action event type is the assisted resolution event comprises directing a message to be sent to a washroom attendant to service the washroom component.

Embodiment 12. The method of embodiments 10 or 11 wherein, the washroom component comprises one of a paper towel dispenser, a urinal, a toilet, bath tissue dispenser, and a faucet.

Embodiment 13. The method of embodiments 10, 11 or 12, wherein the sensor comprises at least one of a consumable product level sensor, a water flow sensor, a flush valve sensor, and a motor current sensor.

Embodiment 14. The method of embodiment 10, wherein in the automated resolution event and in response to directing the washroom component to enter the disabled state comprises directing a message to be sent to a washroom attendant to service the washroom component.

Embodiment 15. The method of embodiments 10, 12 or 13, wherein analyzing the operability data comprises determining the washroom component is jammed or partially clogged and determining the actionable event type is the automated resolution event type.

Embodiment 16. The method of embodiment 10, 12, or 13, wherein analyzing the operability data comprises determining the washroom component is fully clogged and determining the actionable event type is the assisted resolution event type.

Embodiment 17. A method comprising accessing first operability data from a first sensor specifying consumable product use from a first washroom component and second operability data from a second sensor specifying an operational state of a second washroom component; analyzing the first and second operability data to determine an actionable event type for the washroom, wherein the actionable event type comprises an automated resolution event and an assisted resolution event and the analyzing comprises determining high consumable product use from the first washroom component and determining a low operational state for the second washroom component; in response to determining the actionable event type is the automated resolution event, directing a washroom component in the washroom to enter one of the normal operation state or disabled state based on an evaluation of the operability level data after the issue resolution state; and in response to determining the action event type is the assisted resolution event, and directing the washroom component to enter the normal operation state or the disabled state, based on an evaluation of the operability level data.

Embodiment 18. The method of embodiment 17 wherein the first washroom component is a bath tissue or paper towel dispenser and the second washroom component is a toilet or urinal.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus or system on data stored on one or more computer-readable storage devices or received from other sources.

The term data processing apparatus or data processing system encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user computer (e.g., for purposes of displaying data to and receiving user input from a user interacting with the user computer). Data generated at the user computer (e.g., a result of the user interaction) can be received from the user computer at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A method comprising:
    accessing, by a hardware processor of a central management system, first operability data from a pivot mounted arm sensor specifying consumable product use from a bath tissue or paper towel dispenser;
    accessing, by the hardware processor of the central management system, second operability data from a flush valve sensor operating on a valve of a toilet or urinal, and a water flow sensor specifying an operational state of the toilet or urinal;
    analyzing, by the hardware processor of the central management system, the first and second operability data to determine a high consumable product use from the bath tissue or paper towel dispenser by measuring, a change in angular displacement along the pivot mounted arm sensor, and determining a low operational state for the toilet or urinal by determining a lower exit water flow than a normal operational state based on: a flush valve actuation from the flush valve sensor, a water flow reading from the water flow sensor, and a comparison of the water flow reading to a predetermined water flow parameter indicating that the toilet or urinal is clogged;
    in response to the indication that the toilet or urinal is clogged, directing the bath tissue or paper towel dispenser to enter its disabled state and further activating, by a dispense controller of the central management system, a dispenser in the toilet or urinal to release a dissolving agent in a bowl of the toilet or urinal as a treatment to dissolve the clog; and
    in response to the treatment not resolving the clog, causing a valve controller to close the valve to prevent the toilet or urinal from overflowing.

2. The method of claim 1 further comprising:
    sending, by the hardware processor of the central management system, a message to a washroom attendant to service the toilet or urinal in response to the indication that the toilet or urinal remains clogged.

3. The method of claim 1 further comprising:
    determining, by the hardware processor of the central management system, when the consumable product in the paper towel or bath tissue dispenser is depleted; and
    directing, by the hardware processor of the central management system, the bath tissue or paper towel dispenser to enter its disabled state when the consumable product in the paper towel or bath tissue dispenser is depleted.

4. A central management system for managing washroom components comprising:
    a hardware processor;
    a pivot mounted arm sensor configured to generate first operability data specifying consumable product use from a paper towel dispenser or a bath tissue dispenser;
    a flush valve sensor operating on a valve of a toilet or urinal, and a water flow sensor configured to generate second operability data specifying an operational state of the toilet or urinal; and
    a hardware processor configured to access and analyze the first and second operability data, the hardware processor configured to:
        access the first operability data from the pivot mounted arm sensor specifying the consumable product use from the bath tissue or the paper towel dispenser,
        access the second operability data from the flush valve sensor operating on the valve of the toilet or the urinal, and the water flow sensor specifying the operational state of the toilet or urinal,
        analyze the first and second operability data to determine a high consumable product use from the bath tissue or paper towel dispenser by measuring, a change in angular displacement along the pivot mounted arm sensor, and determining a low operational state for the toilet or the urinal by determining a lower exit water flow than a normal operational state based on a flush valve actuation from the flush valve sensor, a water flow reading from the water flow sensor, and a comparison of the water flow reading to a predetermined water flow parameter indicating that the toilet or urinal is clogged, and
        in response to the indication that the toilet or urinal is clogged, directing the bath tissue or paper towel dispenser to enter its disabled state;
    a dispense controller in the toilet or urinal, executed by the hardware processor, to release a dissolving agent in a bowl of the toilet or urinal as a treatment to dissolve the clog; and
    a valve controller, executed by the hardware processor, to close the valve to prevent the toilet or urinal from overflowing in response to the treatment not resolving the clog.

5. The central management system of 4, wherein the hardware processor is further configured to:
send a message to a washroom attendant to service the toilet or urinal in response to the indication that the toilet or urinal remains clogged.

6. The central management system of 4, wherein the hardware processor is further configured to:
determine, when the consumable product in the paper towel or bath tissue dispenser is depleted; and
direct, the bath tissue or paper towel dispenser to enter its disabled state when the consumable product in the paper towel or bath tissue dispenser is depleted.

7. A non-transitory computer-readable storage medium comprising instructions stored thereon and executed by a hardware processor of a central management system to:
access, first operability data from a pivot mounted arm sensor specifying consumable product use from a bath tissue or paper towel dispenser;
access, second operability data from a flush valve sensor operating on a valve of a toilet or urinal, and a water flow sensor specifying an operational state of the toilet or urinal;
analyze, the first and second operability data to determine a high consumable product use from the bath tissue or paper towel dispenser by measuring, a change in angular displacement along the pivot mounted arm sensor, and determine a low operational state for the toilet or urinal by determining a lower exit water flow than a normal operational state based on: a flush valve actuation from the flush valve sensor, a water flow reading from the water flow sensor, and a comparison of the water flow reading to a predetermined water flow parameter indicating that the toilet or urinal is clogged;
in response to the indication that the toilet or urinal is clogged, direct the bath tissue or paper towel dispenser to enter its disabled state and further activating, by a dispense controller of the central management system, a dispenser in the toilet or urinal to release a dissolving agent in a bowl of the toilet or urinal as a treatment to dissolve the clog; and
in response to the treatment not resolving the clog, cause a valve controller to close the valve to prevent the toilet or urinal from overflowing.

8. The non-transitory computer-readable storage medium of claim 7, wherein the instructions are further executed by the hardware processor of the central management system to:
send, a message to a washroom attendant to service the toilet or urinal in response to the indication that the toilet or urinal remains clogged.

9. The non-transitory computer-readable storage medium of claim 7, wherein the instructions are further executed by the hardware processor of the central management system to:
determine when the consumable product in the paper towel or bath tissue dispenser is depleted; and
direct the bath tissue or paper towel dispenser to enter its disabled state when the consumable product in the paper towel or bath tissue dispenser is depleted.

\* \* \* \* \*